(12) United States Patent
Beal et al.

(10) Patent No.: US 6,442,709 B1
(45) Date of Patent: Aug. 27, 2002

(54) SYSTEM AND METHOD FOR SIMULATING DISASTER SITUATIONS ON PEER TO PEER REMOTE COPY MACHINES

(75) Inventors: David Grant Beal, Longmont; Scott Adam States, Arvada; Christopher James West, Boulder, all of CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/247,132

(22) Filed: Feb. 9, 1999

(51) Int. Cl.[7] ................................................ H02H 3/05
(52) U.S. Cl. ............................ 714/33; 714/6; 709/208; 711/165
(58) Field of Search ............................... 714/33, 2, 6, 7, 714/16; 709/208; 710/129; 711/112, 162, 165

(56) References Cited

U.S. PATENT DOCUMENTS

| | | | |
|---|---|---|---|
| 5,796,938 A | * 8/1998 | Emberty et al. | ............... 714/27 |
| 5,835,954 A | * 11/1998 | Duyanovich et al. | ........ 711/162 |
| 5,875,479 A | * 2/1999 | Blount et al. | ................ 711/162 |
| 5,920,695 A | * 7/1999 | Hawthorn et al. | ...... 395/200.38 |
| 5,975,738 A | * 11/1999 | DeKoning et al. | ........... 364/184 |

* cited by examiner

*Primary Examiner*—Robert Beausoleil
*Assistant Examiner*—Rita Ziemer
(74) *Attorney, Agent, or Firm*—Ohlandt, Greeley, Ruggiero & Perle, L.L.P.; Randall J. Bluestone

(57) ABSTRACT

The present invention relates to a method for testing the operability of a Peer to Peer Remote Copy (PPRC) data storage system in disaster situations. A PPRC data storage system includes a host processor, a primary storage subsystem and a secondary storage subsystem where the secondary storage subsystem is coupled to the primary storage subsystem for mirroring of data therebetween. A command is sent from the host processor directing the primary storage subsystem to simulate a disaster. Upon detection of the disaster, the host establishes direct communication with the secondary storage subsystem, and validates the integrity of the system by comparing data from the secondary storage subsystem to data from the primary storage subsystem.

10 Claims, 3 Drawing Sheets

SYSTEM AND METHOD FOR SIMULATING DISASTER SITUATIONS ON PEER TO PEER REMOTE COPY MACHINES

FIELD OF THE INVENTION

This invention relates to testing of the operability of data storage backup systems and, more particularly, to a method of simulating disasters in peer to peer remote copy (PPRC) data storage systems.

BACKGROUND OF THE INVENTION

A typical digital computer system includes a host processor for storing data and executing instructions, and one or more disk subsystems for data storage. Since stored data may be corrupted or destroyed, backup systems have been used to create multiple copies of the stored data, usually on separate disk subsystems so that in the event of a disaster, the data can be recovered from one or more of the copies. Such provision of copies is referred to as either "shadowing" or "mirroring" of the data. When mirroring is carried on by one disk subsystem reflecting data to a remotely positioned disk subsystem, those subsystems are referred to as a "peer to peer remote copy" (PPRC) pair.

Assume a PPRC data storage system comprising a host processor, a primary storage subsystem and a secondary storage subsystem. During normal operation, the host processor issues write commands to the primary storage subsystem and data is mirrored to the secondary storage subsystem by operation of the primary storage subsystem. If the primary storage subsystem suffers a malfunction, the host can then connect directly to the secondary storage subsystem and continue operation, or a remote secondary host can be used to continue operation. The success of such a system is contingent upon an accurate mirroring of data between the primary and secondary storage subsystems.

It is desirable to conduct a controlled test to assure that the PPRC system is properly mirroring data between the storage subsystems, and that the integrity of the data is faithfully maintained. Conventionally, such tests have been performed by manually simulating disasters that interfere with the operation of the PPRC system. This form of testing is time consuming and difficult because the disaster conditions must be set up through manual intervention.

It is an object of this invention to provide an improved method of testing the operation of a PPRC data storage system in disaster situations and verifying the integrity of the mirrored data without manual intervention.

SUMMARY OF THE INVENTION

A PPRC data storage system includes at least a host processor, a primary data storage subsystem and a secondary storage subsystem. Initially, the host processor communicates with the primary storage subsystem while the primary and secondary storage subsystems are remotely coupled as a PPRC pair to enable a mirroring of data therebetween.

To test a disaster scenario, the host processor configures and transmits a special command to the primary storage subsystem. Upon receipt of the command, the primary storage subsystem simulates a disaster to affect all or some of the PPRC disk volumes. The host processor senses the malfunction of the primary storage subsystem by detecting an aberration in its communications with the primary storage subsystem, and responds by establishing communications directly with the secondary storage subsystem. The secondary storage subsystem then terminates the PPRC remote copy operation with the failed primary storage subsystem. Next, the host verifies the integrity of the mirrored data by comparing data from the secondary storage subsystem to data from the primary storage subsystem. This process may be automated to cycle through a set of different types of simulated disasters.

As compared to the prior art, this method allows for relatively quick and easy verification of the operation of a PPRC data storage system and its ability to recover in the case of a disaster without requiring manual intervention.

DETAILED DESCRIPTION OF THE INVENTION

Figure 1:
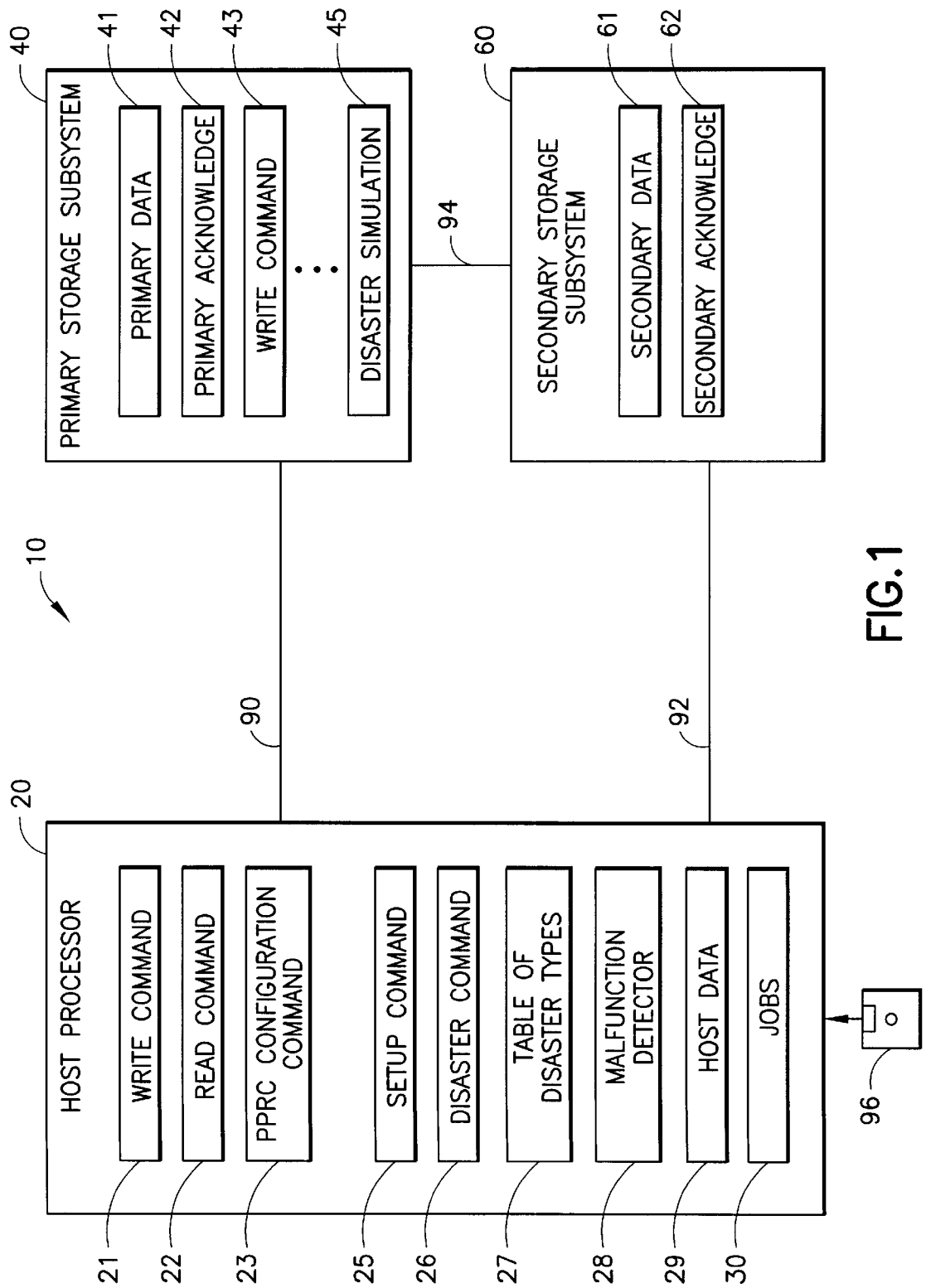
FIG. 1 is a block diagram of a PPRC data storage system particularly adapted to carrying out the invention.

Referring to FIG. 1, a PPRC data storage system 10 generally includes a host processor 20, a primary storage subsystem 40 and a secondary storage subsystem 60. The host processor 20 may communicate directly with primary storage subsystem 40 via primary communication link 90, or with secondary storage subsystem 60 via secondary communication link 92. Primary storage subsystem 40 and secondary storage subsystem 60 are coupled via a remote copy link 94 and are configured to provide a mirroring of data therebetween. That is, secondary data 61 will be a mirror image of primary data 41.

All communication between host processor 20, primary storage subsystem 40 and secondary storage subsystem 60 involves a dispatch of a command from the device desiring an operation and a subsequent acknowledgment from the device that is the target of the command. Primary storage subsystem 40 responds with primary acknowledge 42. Secondary storage subsystem 60 responds with secondary acknowledge 62. The preferred embodiment of this invention includes write, read, PPRC configuration, setup, and disaster commands as described below.

A write command allows the initiator of the command to write data to another device. During normal, non-disaster, operation, (1) host processor 20 issues write command 21, accompanied by host data 29, to primary storage subsystem 40, and (2) primary storage subsystem 40 issues write command 43, accompanied by primary data 41, to secondary storage subsystem 60 to execute a remote copy operation. Host processor 20 does not write to secondary storage subsystem 60 during normal operation. Host processor 20 may issue write command 21, accompanied by host data 29, to secondary storage subsystem 60, only if secondary storage subsystem 60 is not configured to operate as part of a PPRC pair.

A read command allows the initiator of the command to read data from another device. Host processor 20 can issue read command 22 to primary storage subsystem 40 to read primary data 41, or to secondary storage subsystem 60 to read secondary data 61. During normal, non-disaster, operation, host processor 20 reads only from primary storage subsystem 40. Host processor 20 may read from secondary storage subsystem 60 only if secondary storage subsystem 60 is not configured to operate as part of a PPRC pair.

A PPRC configuration command 23 is used to configure primary storage subsystem 40 and secondary storage subsystem 60 as a PPRC pair. The command is issued by host processor 20 to primary storage subsystem 40. Primary storage subsystem 40 relays the command to secondary storage subsystem 60.

Setup command 25 is issued by host processor 20 to secondary storage subsystem 60 when host processor 20 wishes to establish full communications with secondary storage subsystem 60 and terminate the PPRC pair.

Disaster command 26 is issued by host processor 20 to primary storage subsystem 40 to initiate a disaster simulation 45 in primary storage subsystem 40.

During normal, non-disaster operation, host processor 20 executes jobs 30, which includes issuing write commands 21 and read commands 22 to primary storage subsystem 40. Primary storage subsystem 40 issues write commands 43 to secondary storage subsystem 60 as necessary to support the remote copy operation.

In the case of a disaster causing a malfunction of primary storage subsystem 40, host processor 20 senses an aberration in its communications with primary storage subsystem 40, via malfunction detector 28. In turn, host processor 20 issues setup command 25 to secondary storage subsystem 60. This establishes full communication, enabling read and write commands, between host processor 20 and secondary storage subsystem 60 and causes termination of the PPRC pair.

Host processor 20 includes the capability to format and issue a disaster command 26, based on a selection from a table of disaster types 27. Upon dispatch to and receipt of disaster command 26, primary storage subsystem 40 executes a disaster simulation 45. For example, disaster simulations can include a malfunction of the primary communication link 90, a time-out where primary storage subsystem 40 fails to send primary acknowledge 42 within a predetermined period of time after receiving a command, or a total failure of primary storage subsystem 40.

Figures 2, 2A, 2B:
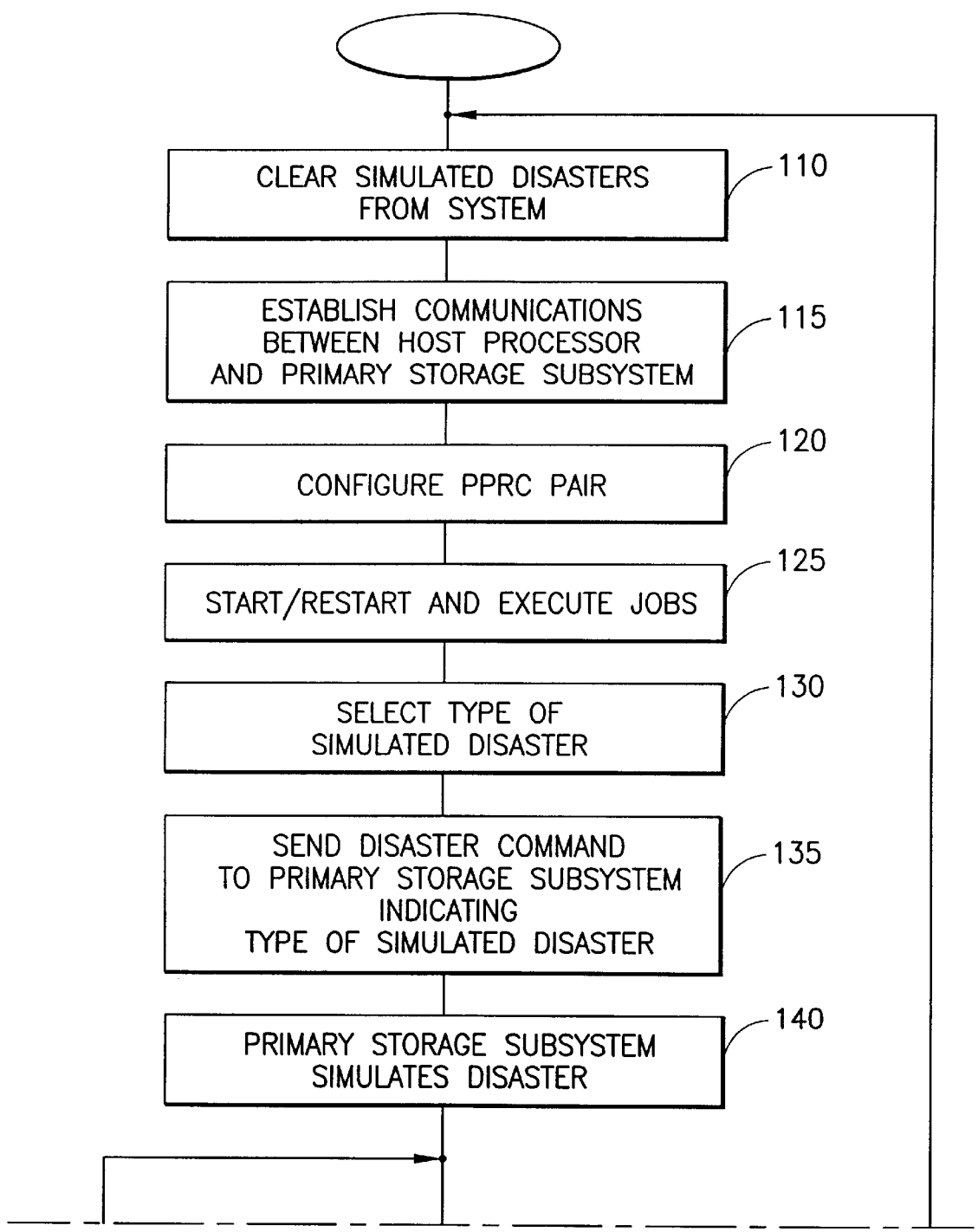
FIG. 2 is a logical flow diagram illustrating the method of the invention.
Figure 2B:
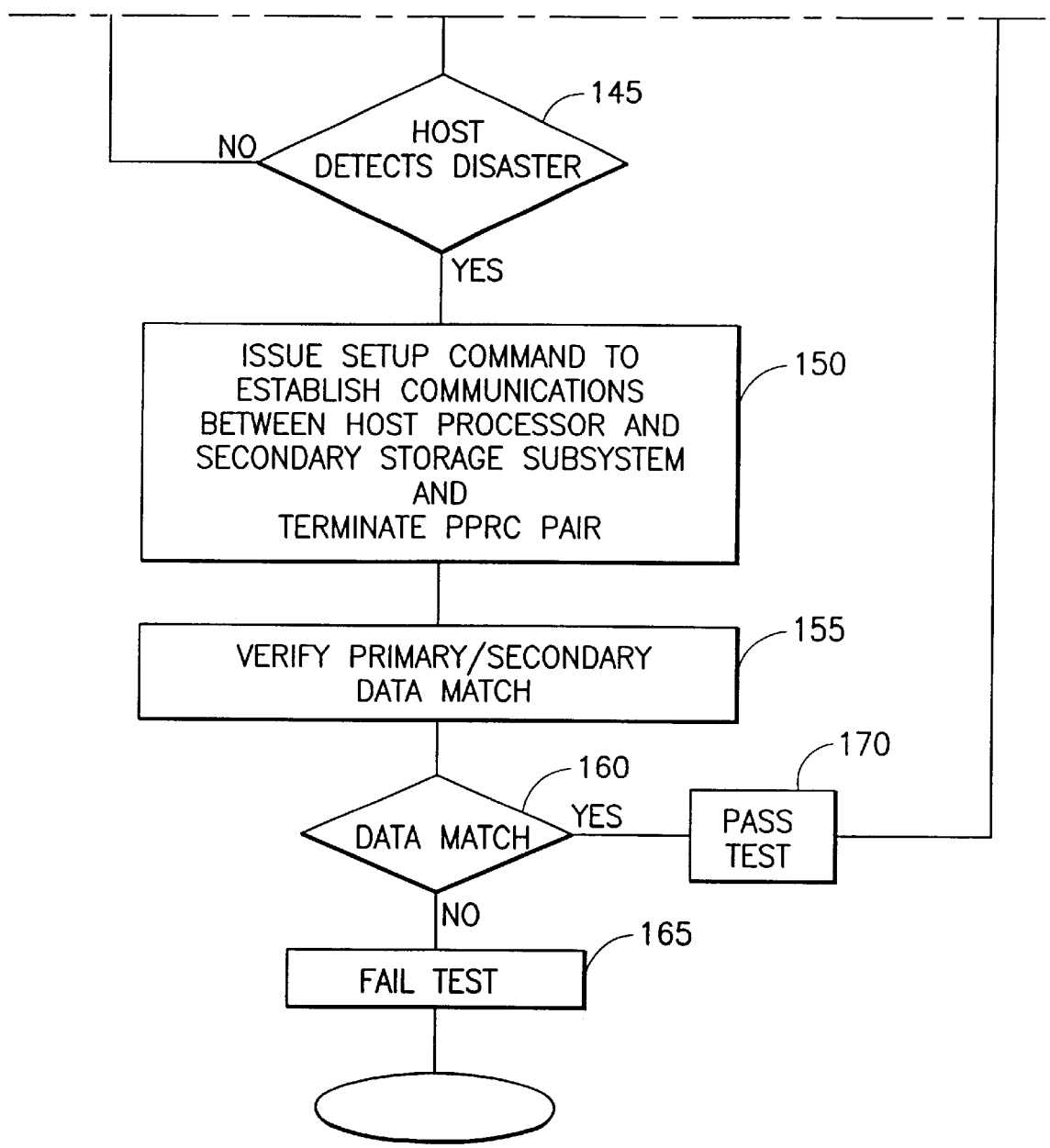

FIG. 2. illustrates the preferred method of the invention. Beginning with step 110, all simulated disasters are cleared from the PPRC data storage system 10. Next, in step 115, normal communications are established between host processor 20 and primary storage subsystem 40. In step 120, host processor 20 issues PPRC configuration command 23 to configure primary storage subsystem 40 and secondary storage subsystem 60 as a PPRC pair.

In step 125, jobs 30 are started, or re-started and executed. Host processor 20 issues write commands 21 and read commands 22 to primary storage subsystem 40. Concurrently, primary storage subsystem 40 issues write commands 43 to secondary storage subsystem 60 to effectuate the remote copy operation.

In step 130, host processor 20 selects a disaster type from table of disaster types 27, and in step 135, a disaster command 26 is formatted to indicate the selected disaster type and is then issued to primary storage subsystem 40. In step 140, primary storage subsystem 40 executes a disaster simulation 45 based on disaster command 26. In step 145, host processor 20 continues processing until it senses the malfunction.

After detection of the malfunction (step 145), the method proceeds to step 150 where host processor 20 issues, to secondary storage subsystem 60, a setup command 25. This establishes full communications with secondary storage subsystem 60 via secondary communication link 92 and causes termination of the PPRC status between primary storage subsystem 40 and secondary storage subsystem 60.

To verify the integrity of the data mirrored between primary data storage subsystem 40 and secondary storage subsystem 60, in step 155, secondary data 61 is compared to primary data 41. This comparison can be performed by allowing host processor 20 to continue operation using secondary data 61 and verifying proper execution of jobs 30, or in the alternative, reading secondary data 61 and primary data 41 and comparing the two sets of data. In either case, the comparison is evaluated in step 160.

In step 160, if the determination is that the data does not match, the method proceeds to step 165 where a FAIL condition is indicated.

In step 160, if the determination is that the data does match, the method proceeds to step 170 where a PASS condition is indicated and then proceeds back to step 110. From this point, the method steps will be executed as previously described, but in step 130, a different disaster type can be selected from the table of disaster types 27.

It should be understood that the foregoing description is only illustrative of the invention. Various alternatives and modifications can be devised by those skilled in the art without departing from the invention. For example, the simulation could be controlled, or the disaster type could be selected, through a user-friendly interface. Further, while the procedures required to execute the invention hereof are indicated as already loaded into the memory of the storage subsystems, they may be configured on a storage media, such as data memory 96 in FIG. 1, for subsequent loading into the controlling subsystem processors. Accordingly, the present invention is intended to embrace all such alternatives, modifications and variances which fall within the scope of the appended claims.

What is claimed is:

1. A method for testing the operability of a data storage system in a disaster situation, said data storage system including a host processor, a primary storage subsystem for supporting said host processor and a secondary storage subsystem coupled to said primary storage subsystem for mirroring data stored to said primary storage subsystem, said primary storage subsystem having primary data and said secondary storage subsystem having secondary data, said method comprising the steps of:

(A) establishing communications between said host processor and said primary storage subsystem;

(B) configuring said primary storage subsystem and said secondary storage subsystem as a remote copy pair;

(C) sending a disaster command from said host processor to said primary storage subsystem;

(D) simulating a disaster in said primary storage subsystem as directed by said disaster command;

(E) detecting said disaster;

(F) establishing communications directly between said host processor and said secondary storage subsystem; and (G) terminating said remote copy pair.

2. The method of claim 1, further comprising, before said step (C), the steps of:

(i) selecting a disaster type from a plurality of disaster types; and (ii) formatting said disaster command to indicate said disaster type.

3. The method of claim 1, further comprising, the steps of verifying data integrity by:

(A) executing one or more test procedures, using said primary data and said secondary data, to facilitate a comparison of said primary data and said secondary data; and (B) determining the result of step (A), wherein,
  (i) if said secondary data matches said primary data, then said result is PASS; and
  (ii) if said secondary data does not match said primary data, then said result is FAIL.

4. The method of claim 3, further comprising, while said result is PASS, repeating said steps (A) through (G).

5. A memory media including a program for controlling a data storage system, said data storage system including a host processor, a primary storage subsystem for supporting said host processor and a secondary storage subsystem coupled to said primary storage subsystem for mirroring data stored to said primary storage subsystem, said primary storage subsystem having primary data and said secondary storage subsystem having secondary data, said memory media comprising:
  (A) a means for controlling said host processor and said primary storage subsystem to establish communications between said host processor and said primary storage subsystem;
  (B) a means for controlling said primary storage subsystem and said secondary storage subsystem to configure said primary storage subsystem and said secondary storage subsystem as a remote copy pair;
  (C) a means for controlling said host processor to send a disaster command from said host processor to said primary storage subsystem.
  (D) a means for controlling said primary storage subsystem to simulate a disaster in said primary storage subsystem as directed by said disaster command;
  (E) a means for detecting said disaster;
  (F) a means for establishing communications directly between said host processor and said secondary storage subsystem; and
  (G) a means for terminating said remote copy pair.

6. The memory media as recited in claim 5, further comprising a means for controlling said host processor to:
  (i) select a disaster type from a plurality of disaster types; and
  (ii) format said disaster command to indicate said disaster type.

7. The memory media as recited in claim 5, further comprising, a means for controlling said host processor to verify data integrity by:

(H) executing one or more test procedures, using said primary data and said secondary data, to facilitate a comparison of said primary data and said secondary data; and
(I) determining the result of step (A), wherein,
  (i) if said secondary data matches said primary data, then said result is PASS; and
  (ii) if said secondary data does not match said primary data, then said result is FAIL.

8. The memory media as recited in claim 7, further comprising:
  a means for controlling said host processor to evaluate said result, and while said result is PASS, to continue controlling said host processor, said primary storage subsystem and said secondary storage subsystem in accordance with said paragraphs (A) through (G) inclusive.

9. A data storage system comprising:
  a primary storage subsystem for storing primary data and including means for simulating a disaster in the form of a malfunction of said primary storage subsystem;
  a secondary storage subsystem for mirroring said primary data as secondary data;
  (A) a host processor for:
    operating in conjunction with said primary storage subsystem for storage of said primary data therein, and for enabling said primary storage subsystem and said secondary storage subsystem to be configured as a remote copy pair;
  (B) said host processor controlled to send a disaster command to said primary storage subsystem to enable said primary storage subsystem to invoke operation of said means for simulating a disaster; and for then establishing communications directly between said host processor and said secondary storage subsystem, and terminating said remote copy pair.

10. The data storage system of claim 9, wherein said host processor further:
  selects a disaster type from a plurality of disaster types; and
  formats said disaster command to indicate said disaster type.

* * * * *